No. 751,377.

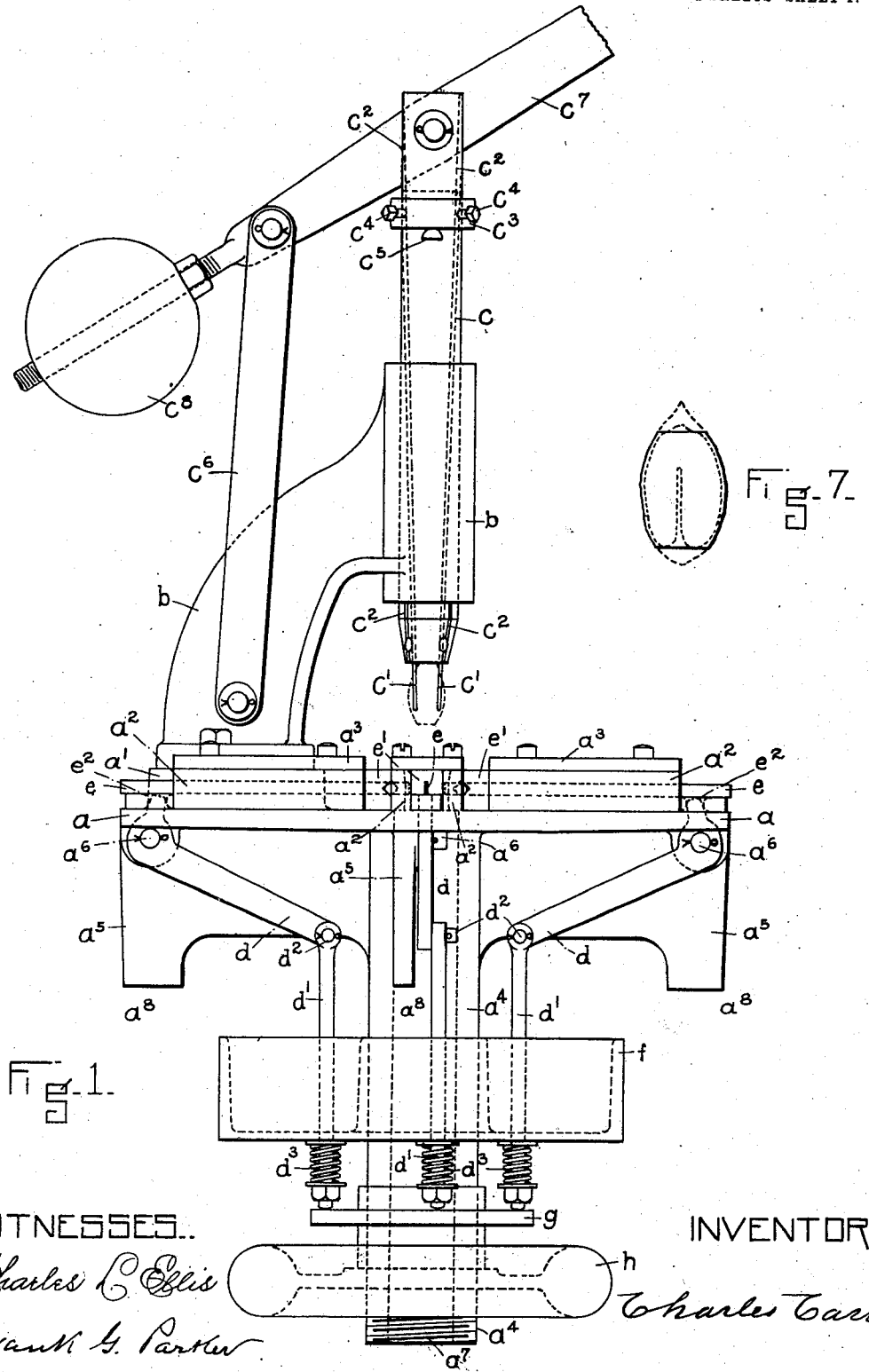

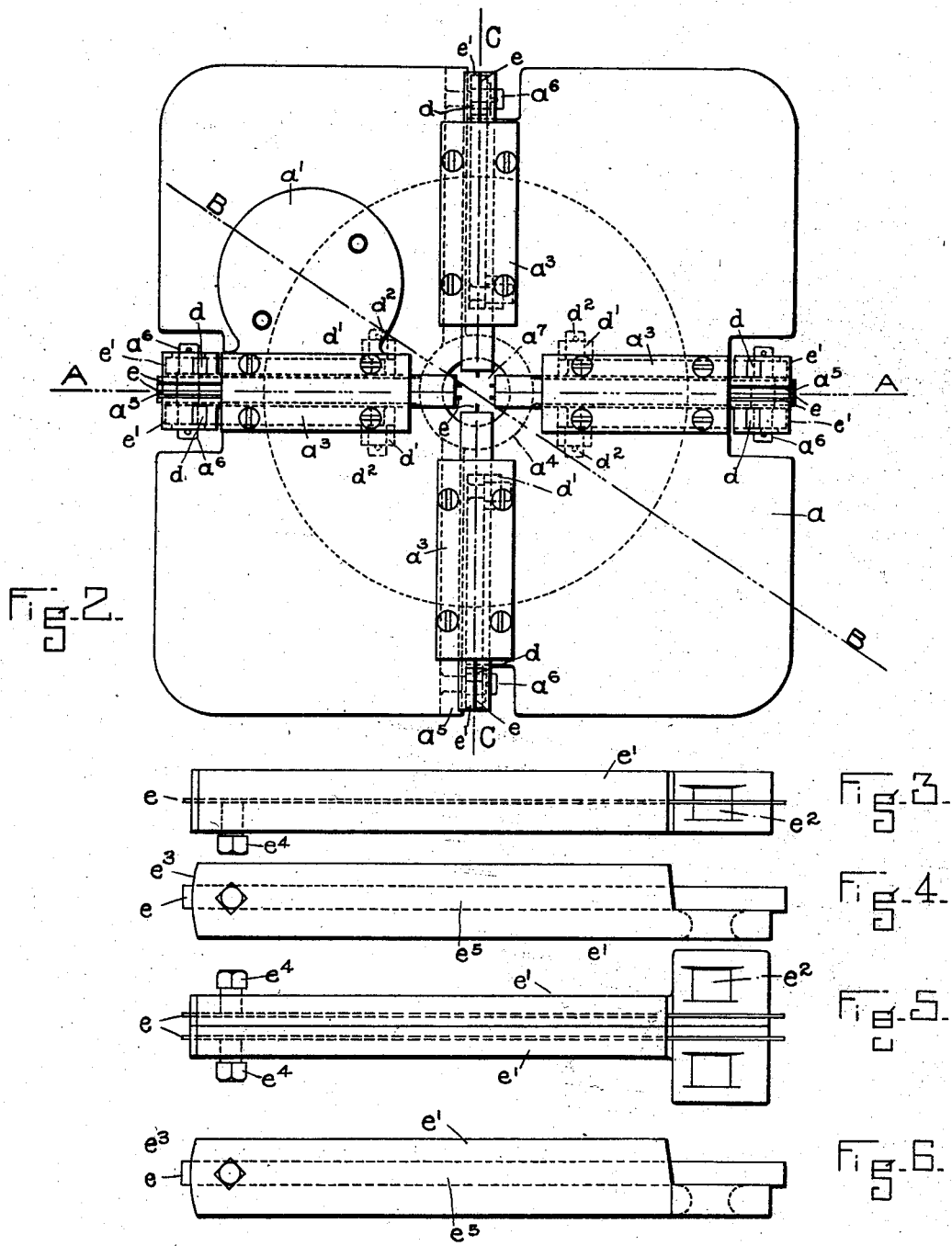

Patented February 2, 1904.

UNITED STATES PATENT OFFICE.

CHARLES CARR, OF BOSTON, MASSACHUSETTS.

NUT-SHELLING MACHINE.

SPECIFICATION forming part of Letters Patent No. 751,377, dated February 2, 1904.

Application filed January 24, 1903. Serial No. 140,405. (No model.)

*To all whom it may concern:*

Be it known that I, CHARLES CARR, a citizen of the United States, residing in Boston, in the county of Suffolk and State of Massachusetts, have invented a new and useful Machine for Shelling Nuts, Particularly Pecan Nuts, of which the following is a specification.

The invention has for its object an efficient and economical process for removing the shells of nuts in such a manner that the kernel or the meat inside is not mutilated or broken, the shell only being cut or split, so that the kernel may be readily removed in one whole piece or in two whole halves, which has not heretofore been successfully done.

By my method for accomplishing the above result I first cut off with a simple device one or both ends of the nut-shell at about the termination of the kernel or meat. This cutting off of the shell ends is indispensable to success. I then place the nut on the cutter-knives or against a movable plunger in my shelling-machine, which in its movement forces the nut between and past several knives arranged in the path of its travel, the said knives splitting the shell in several sections, which are easily removable by hand. The devices for accomplishing this result will be hereinafter more particularly described.

Referring to the drawings, Figure 1 is a front elevation of the machine. The center line of the hand-lever $C^7$ for operating the plunger is on the line B B. In this figure a nut with its ends cut off is shown by dotted lines in its position when retained by the spring-wires. Fig. 2 is a plan of the machine with the plunger and its guide-bracket and hand-lever removed. Figs. 3, 4, 5, and 6 are views of the knife-carriers and the knives. Fig. 7 illustrates a nut with its ends cut off.

The bed $a$ has bolted to the boss $a'$ an upright bracket $b$, which guides the vertical plunger $c$. The plunger $c$ is provided with spring-wires $c'$, which are free at their lower ends to move away from or toward its center in slots $C^2$, which are spaced around its circumference and which vary in depth from almost nothing at its top to a much greater depth at its bottom. These spring-wires are held in position at the upper end of the plunger by the collar $c^3$, provided with set-screws $c^4$, each bearing on a spring-wire.

The plunger $c$ may be actuated by hand or by power in any of the well-known ways. If by hand, the arrangement is as shown in Fig. 1. Links $c^6$ connect the bracket $b$ and the short end of the hand-lever $c^7$, which is shown broken off for want of space. The handle of this lever is counterweighted by ball $c^8$, which is adjustable by means of the screw on short end of hand-lever. The spring-wires $c'$, which may be three or more in number, bear on the bottoms of the slots $c^2$, their tension being but very little. Their purpose is to hold or retain the nut when it is placed between them until after the plunger has forced the nut onto the knives. The plunger $c$ is limited in its movement by the stop-pin $c^5$.

The bed $a$ is a flat plate having four sets of knife-carrier guide-lugs $a^2$ on its top, the guide-lugs being arranged on the center lines A A and C C. These guides have covers $a^3$, secured to the lugs by screws. On the under side of the bed $a$ is a hub $a^4$, threaded at its lower end for a hand-wheel $h$. Ribs $a^5$ on under side of table extend outward from the hub $a^4$ and at their upper outer edge support the pins $a^6$, upon which the levers $d$ are pivoted. Through the center of this hub $a^4$ is a hole $a^7$, through which the nut passes when it drops from the plunger-springs $c'$ after passing through the knives.

The machine is designed to rest on the surfaces $a^8$. The levers $d$, of which there are six shown on the drawings, operate the six cutter-knives $e$, each knife being independently operated by its lever $d$. Each lever has at its long end depending rods $d'$, hung on pins $d^2$, which pass through a weighted box $f$. This weighted box is free to move vertically upon the hub $a^4$ and is supported by springs $d^3$, which encircle the lower ends of the rods $d'$. The short ends of the levers $d$ are designed to operate in holes $e^2$, which are in the outer ends of the knife-carriers $e'$. By this arrangement—i. e., the single knife-controlling weight-box being hung on the rods $d'$—the positions of the cutting inner ends of the knives are always approximately concentric with the hole in the bed, the knives themselves being nearly radial thereto.

In operation a nut having both ends cut off is placed between the plunger spring-wires or placed on the cutter-knives, care being taken that it is so placed that the cutting-knives shall cut between the lobes of the kernel, as it has been proved to be the most successful way to obtain whole kernels. The wire springs retain the nut, and when it is placed in the best position predetermined by experience the machine does more efficient work. The plunger is then operated and carrying the nut retained between the wire springs it is forced between and through the knives, which split or cut the shell. When the nut strikes the knives, they enter the shell, there being no tendency at this point for them to move away from the center and they do not until the nut's increasing diameter strikes against the face $e^3$ of the knife-carrier and then only to the extent that the nut itself moves them out through its contact with the face $e^3$.

The weight-box $f$, supported by the mechanism for operating the knives in and out, is filled with sufficient shot or other suitable weight, so that the face $e^3$ of each knife-carrier is kept in contact with the outside of the nut-shell, conforming to all its irregularities and acting as a depth-gage for the cutting-knives. By means of this arrangement for hanging the weight-box $f$ on springs with the cutting ends of the knives tending toward the center if a nut should have any irregularities of shape or any unevenness on its surface the knife at that point only will be forced in or out from the center by its gage-face $e^3$, though it will keep cutting the nut-shell, the extra movement being absorbed by its spring $d^3$. These springs may be regulated by the nuts on the rods $d'$. The ends of the rods $d'$ bear upon the flange of a slidable collar $g$, which is regulated vertically by a hand-wheel $h$, movable on the thread on the lower end of the hub $a^4$. By means of this hand-wheel the cutters may be set to take large or small nuts, it being only necessary to run nuts of approximately the size best adapted to the given position of the knives.

The cutters $e$, as shown in the drawings, are made of flat steel of thin section, only the exposed part of the cutting end being sharpened. The carriers $e'$ are slotted throughout their length at $e^5$ to receive the cutters $e$, which are free to pass through said slot. The cutters are kept in position in the carriers by the set-screws $e^4$. These knives or cutter-carriers are free to move between guide-lugs $a^2$ upon the bed $a$, being regulated and controlled in their movement by the short end of the lever $d$, which projects through holes $e^2$. The cutting edge of the knives is on the top side of the projecting part at inner end of carriers. The inner end of the knife-carriers $e'$ are shaped as shown in Figs. 4 and 6 at $e^3$ for the purpose of gaging the depth to which the projecting knives may cut. It is the contact of this surface $e^3$ and the outside of the nut when the nut is descending that moves the carriers $e'$ out, though the knives do not clear the shell or nut during its passage through or by them, for where the nut's greatest diameter has pushed the cutters way out the weight-box F, hanging on the long ends of the levers $d$, still keeps the faces $a^3$ against the nut until it is forced through the cutters and drops clear of them. The faces $e^3$ also act as guides for the descending nut, centering it so that each knife projecting from the knife-carrier penetrates the nut-shell so as to cut its respective section.

As shown in the drawings, the knives are in a horizontal position and are arranged approximately radial about the center line of the vertical movement of the nut. The arrangement of the knives as shown in Fig. 2 is the best for penetrating the fibrous growth between the lobes of the nut-kernel, and for this reason they are not spaced regularly around. The cutters shown side by side in the same guide (there being two pairs) have independent movement and are operated by independent levers, although each pair works in one guide.

I do not limit myself to the specific arrangement and relation of the various parts described herein. Radially-yielding shell-cutters have heretofore been used; but in all those which have come under my notice the knives have been pressed in by springs acting independently of each other, while in my machine all the cutters are collectively controlled by a weight common to them all, whereby the knives are kept concentric to the center line of the plunger. This weight hangs on rods connected to the bell-cranks and rests on the spiral springs which encircle the lower ends of these rods. Each rod bears its proportionate part of the weight, and each cutter may have a slightly independent movement when any unevenness of the nuts is encountered through the give of its spring, though the power for operating these cutters is the single weight common to them all.

Having described my invention, I claim—

1. In a nut-shelling machine in combination, a bed having knife-carrier guides thereon, a plunger, a series of cutting-knives, carriers for cutting-knives operative in the guides on the bed, bell-crank levers for operating said knife-carriers, depending rods attached to the bell-cranks, and a weight attached to said rods, arranged substantially as shown and described.

2. In a nut-shelling machine in combination, the machine-bed with a hub on under side having a central hole extending through, a plunger movable in a line with said hole, horizontally-moving knives having their cutting ends approximately concentric to the said hole and in the line of travel of the plunger, means for connecting the knives to a weight, and a single weight common to all the knives, connected to them in such manner that their movement is simultaneous, substantially as shown and described.

3. In a nut-shelling machine in combination, the machine-bed with hub on under side having a central hole extending through, a plunger movable in line with said hole, horizontally-moving knife-carriers approximately radiating from said hole, a single horizontally-adjustable knife within each carrier, bell-crank levers connected to the knife-carriers and to pendent rods, springs, one on each rod below and bearing against a single weight, and the said weight, which acts through rods, bell-cranks and knife-carriers on all the knives.

4. In a nut-shelling machine in combination, the machine-bed, a plunger for forcing nuts past a series of knives, radiating knife-carrier bearings, on the machine-bed, located around a central hole, individually and independently adjustable cutting-knives secured within the carriers, the said knife-carriers, bell-crank levers and rods connecting to a single weight acting in common on all the knife-carriers, the said weight, and springs, one for each rod for supporting the weight, arranged substantially as shown and described.

5. In a nut-shelling machine, in combination, a bed-plate, having a central hole and central hub, a flat-ended plunger, with means for moving same, a series of horizontally-traveling single cutting-knives, their cutting ends approximately concentric to the central hole in the bed, means for connecting the knives to pendent rods, the pendent rods, connecting with a single weight through which the rods pass, their ends resting on a collar having vertical movement, the said weight, simultaneously controlling all of the knives, a sliding collar, for simultaneously raising and lowering the depending rods, thereby varying the horizontal relation of the cutting-knives, and a hand-wheel, for elevating and depressing the said collar, operative on a screw-thread at lower end of hub, arranged substantially as shown and described.

6. In a machine for shelling nuts, which have had their ends flattened by clipping, a bed-plate having a central hub and provided with guide-bearings for a series of cutting-knives, a flat-ended plunger, with means for moving same, a series of horizontally-moving cutting-knives, approximately radiating from a central hole in the bed, bell-cranks, rods and springs connecting the cutting-knives with a weight common to all the knives and for simultaneously forcing them inward, the said weight, through which the depending rods project and bear upon a sliding collar, a slidable collar, free to move upon the central hub of the bed and resting upon a hand-wheel, and a hand-wheel free to turn upon a threaded portion of the bed-hub whereby its elevation determines the horizontal distance between the cutting ends of the knives, arranged substantially as shown and described.

7. In a machine adapted to shell nuts that have previously had their ends flattened by clipping, a bed-plate having a central hub on under side and knife-carrier bearings on upper side, a flat-ended plunger, in line with the center of the hub, for forcing the nut past the cutting-knives, which are arranged about a hole through the center of the hub, adjustable knives operative in the bearings on the bed, means for keeping these knives in their inmost position while at rest, and means for simultaneously adjusting the relation of the cutting ends of the knives to each other, arranged substantially as shown and described.

CHARLES CARR.

Witnesses:
 CHARLES L. ELLIS,
 FRANK G. PARKER.